United States Patent [19]
Brunson

[11] Patent Number: 5,571,485
[45] Date of Patent: Nov. 5, 1996

[54] COMBINED ELECTRICALLY HEATABLE CONVERTER BODY

[75] Inventor: Gordon W. Brunson, Chagrin Falls, Ohio

[73] Assignee: W. R. Grace & Co.-Conn., New York, N.Y.

[21] Appl. No.: 428,803

[22] Filed: Apr. 24, 1995

Related U.S. Application Data

[63] Continuation-in-part of Ser. No. 282,716, Jul. 29, 1994, abandoned.

[51] Int. Cl.⁶ .............................. F01N 3/10; B01D 53/34
[52] U.S. Cl. .................... 422/174; 422/171; 422/177; 422/180; 422/199; 422/211; 422/222; 60/300; 428/577; 428/582; 411/553
[58] Field of Search .................................. 422/171, 174, 422/177, 178, 179, 180, 199, 211, 222; 502/439, 527; 60/300; 55/DIG. 30; 428/577, 582; 24/563; 411/533, 552, 521

[56] References Cited

U.S. PATENT DOCUMENTS

| | | | |
|---|---|---|---|
| 4,379,812 | 4/1983 | Sara | 428/577 |
| 5,118,475 | 6/1992 | Cornelison | 422/174 |
| 5,356,598 | 10/1994 | Boubehira | 422/180 |
| 5,371,050 | 12/1994 | Belitskus | 501/95 |
| 5,384,099 | 1/1995 | Sheller | 422/174 |
| 5,441,706 | 8/1995 | Whittenberger | 422/174 |

FOREIGN PATENT DOCUMENTS

4102890  8/1992  Germany.

*Primary Examiner*—Robert Warden
*Assistant Examiner*—Hien Tran
*Attorney, Agent, or Firm*—Beverly J. Artale

[57] ABSTRACT

There is provided a novel terminal bus and retainer for a multicellular converter, particularly a catalytic converter, which converter is characterized by an electrically heatable portion and a light-off portion. The electrically heatable portion includes flat thin metal strips as heater bands and flat thin metal bands not electrically heatable. A terminal bus and retainer is adapted to be connected to a voltage source and to the ends of the heater bands. A portion of the terminal bus and retainer may be used as a connector bus. The terminal bus and retainer also retains the thin metal foil elements in tightly spirally wound condition. These devices are especially useful in catalytic converters for automotive vehicles.

34 Claims, 6 Drawing Sheets

COMBINED ELECTRICALLY HEATABLE CONVERTER BODY

This application is a continuation-in-part of my commonly owned application Ser. No. 08/282,716 filed 29 Jul. 1994, now abandoned.

This invention relates to a converter body, and more particularly to a converter body wherein a portion thereof is electrically heatable. The remaining portion is a non-electrically heatable "light-off" portion integral with the electrically heatable portion as will be described below. The converter body is characterized by a cellular metal honeycomb desirably formed of thin metal layers or strips which are contained in a retaining shell. The combination of the metal honeycomb and the retaining shell forms a core which may then be placed in a housing. In one embodiment, the housing is adapted to be inserted in an exhaust line extending from an internal combustion engine, for example, to aid in the removal of pollutants contained therein.

The devices thereof are improved in the provision of a novel terminal and retainer for the converter body.

RELATED APPLICATIONS

This application is related to copending, commonly owned application Ser. No. 08/282,715 filed 29 Jul. 1994, by Gordon W. Brunson and William A. Whittenberger, the disclosure of which is incorporated herein by reference thereto.

BACKGROUND OF THE INVENTION AND PRIOR ART

This invention will be described in connection with embodiments especially adapted for use in exhaust lines from various types of engines, e.g., internal combustion engines of the spark ignited or compression ignited types, stationary or mobile, or gas turbine engines. It will be understood, however, that the converters of the present invention may be used to effect various chemical reactions, particularly those occurring in fluid streams, especially gas streams, which reactions are catalyzed or uncatalyzed.

Turning now to converters especially useful in exhaust lines extending from internal combustion engines, e.g., those used automotive vehicles, the purpose of such catalytic converters is to convert pollutant materials present in the exhaust stream, e.g., carbon monoxide, unburned hydrocarbons, nitrogen oxides, etc., to carbon dioxide, nitrogen and water prior to discharge into the atmosphere. Conventional automotive catalytic converters utilize an oval or circular cross-section ceramic honeycomb monolith having square or triangular straight-through openings or cells with catalyst deposited on the walls of the cells; catalyst coated refractory metal oxide beads or pellets, e.g., alumina beads; or corrugated thin metal foil multicelled honeycomb monolith, e.g., a ferritic stainless steel foil honeycomb monolith, having a refractory metal oxide coating and catalyst carried on said coating and supported on the surfaces of the cells. The catalyst is normally a noble metal, e.g., platinum, palladium, rhodium, ruthenium, or a mixture of two or more of such metals. Zeolite coatings may also be used for the adsorption and desorption of pollutants to aid in their removal. The catalyst catalyzes a chemical reaction, mainly oxidation, whereby the pollutant is converted to a harmless by-product which passes through the exhaust system to the atmosphere.

However, conversion to such harmless by-products is not efficient initially when the exhaust gases are relatively cold, e.g., at cold engine start. To be effective at a high conversion rate, the catalyst and time surface of the converter which the exhaust gases contact must be at or above a minimum temperature, e.g., 390 degrees F. for carbon monoxide, 570 degrees F. for volatile organic compounds, and about 900 degrees F. for methane or natural gas. Otherwise conversion to harmless by-products is poor and cold start pollution of the atmosphere is high. It has been estimated that as much as 80% of the atmospheric pollution caused by vehicles, even though equipped with conventional non-electrically heated catalytic converters, occurs in the first two minutes of operation of the engine from cold start. Once the exhaust system has reached its normal operating temperature, a non-electrically heated catalytic converter is optimally effective. Hence, it is necessary for the relatively cold exhaust gases to make contact with hot catalyst so as to effect satisfactory conversion. Compression ignited engines, spark ignited engines, reactors in gas turbines, small bore engines such as used in lawn mowers, trimmers, boat engines, and the like have this need.

To achieve initial heating of the catalyst at engine start-up, there is conveniently provided an electrically heatable catalytic converter unit, preferably one formed of a thin metal honeycomb monolith. This monolith may be formed of spaced flat thin metal strips, straight-through corrugated thin metal strips, pattern corrugated thin metal strips, e.g., herringbone or chevron corrugated thin metal strips, or variable pitch corrugated thin metal strips (such as disclosed in U.S. Pat. No. 4,810,588 dated 7 Mar. 1989 to Bullock et al) or a coordination thereof, which monolith is connected to a 12 volt to 108 volt or higher, AC or DC supply, single or multi-phase, preferably at the time of engine start-up and afterwards to elevate the catalyst to and maintain the catalyst at at least 650 degrees F. plus or minus 30 degrees F. Alternatively, power may also be supplied for a few seconds prior to engine start-up.

Catalytic converters containing a corrugated thin metal (stainless steel) monolith have been known since at least the early 1970's. See Kitzner U.S. Pat. Nos. 3,768,982 and 3,770,389 each dated 30 Oct. 1973. More recently, corrugated thin metal monoliths have been disclosed in U.S. Pat. No. 4,711,009 dated 8 Dec. 1987 to Cornelison et al; U.S. Pat. Nos. 4,152,302 dated 1 May 1979, 4,273,681 dated 16 Jun. 1981, 4,282,186 dated 4 Aug. 1981, 4,381,590 dated 3 May 1983, 4,400,860 dated 30 Aug. 1983, 4,519,120 dated 28 May 1985, 4,521,947 dated 11 Jun. 1985, 4,647,435 dated 3 Mar. 1987, 4,665,051 dated 12 May 1987 all to Nonnenmann alone or with another; U.S. Pat. No. 5,070,694 dated 10 Dec. 1991 Whittenberger; International PCT Publication Numbers WO 89/10470 (EP 412,086) and WO 89/10471 (EP 412,103) each filed 2 Nov. 1989, claiming a priority date of 25 Apr. 1988. The above International Publication Numbers disclose methods and apparatus for increasing the internal resistance of the device by placing spaced discs in series, or electrically insulating intermediate layers. Another International PCT Publication is WO 90/12951 published 9 Apr. 1990 and claiming a priority date of 21 Apr. 1989, which seeks to improve axial strength by form locking layers of insulated plates. Another reference which seeks to improve axial strength is U.S. Pat. No. 5,055,275 dated 8 Oct. 1991 to Kannainian et al. Reference may also be had to PCT Publication Number WO 92/13636 filed 29 Jan. 1992 claiming a priority date of 31 Jan. 1991. This application relates to a honeycomb body along an axis of which fluid can flow through a plurality of channels. The honeycomb has at least two discs in spaced relation to each other. According to the specification, there is at least one bar type support near the axis by which the discs are connected together and mutually supported. The invention is said to make possible design of the first disc for fast heating up through exhaust gas passing through or applied electrical current. The honeycomb body serves as a bearer for catalyst in the exhaust system of an internal combustion engine. Another reference is German Patent Application Number 4,102,890 A1 filed 31 Jan. 1991 and published 6 Aug. 1992. This application discloses a spirally wound corrugated and flat strip combination wherein the flat strip contains slots and perforations and is electrically heatable. The flat strips include a bridge between leading and trailing portions. Groups of such strips are separated by insulation means. The core is provided with a pair of circular retainer segments which are separated by insulation means. No end tabs are provided, and the flat strip portions are unitary. Another reference is U.S. Pat. No. 5,102,743 dated 7 Apr. 1992. This patent discloses a honeycomb catalyst carrier body of round, oval or elliptical cross section including a jacket tube and a stack of at least partially structured sheet-metal layers intertwined in different directions in the jacket tube. The stack has a given length and a given width. At least one of the sheet metal layers has a greater thickness over at least part of one of the dimensions than others of the layers. Such at least one layer is formed of thicker metal or of a plurality of identically structured metal sheets in contiguous relation.

Still another reference is the patent to Maus et al U.S. Pat. No. 5,146,743 dated 15 Sep. 1992 which discloses a system including a main catalyst and an electrically heatable precatalyst disposed upstream of the main catalyst.

A common problem with prior devices has been their inability to survive severe automotive industry durability tests which are known as the Hot Shake Test and the Hot Cycling Test.

The Hot Shake test involves oscillating (100 to 200; Hertz and 28 to 60 G inertial loading) the device in a vertical attitude at a high temperature (between 800 and 1100 degrees C.; 1472 to 2012 degrees F., respectively) with exhaust gas from a running internal combustion engine simultaneously passing through the device. If the catalytic device telescopes or displays separation or folding over of the leading or upstream edges of the foil leaves up to a predetermined time, e.g., 5 to 200 hours, the device is said to fail the test. Usually a device that lasts 5 hours will last 200 hours. Five hours is equivalent to 1.8 million cycles at 100 Hertz.

The Hot Cycling Test with exhaust flowing at 800 to 1100 degrees C.; 1472 to 2012 degrees F.) and cycled to 120 to 150 degrees C. once every 15 to 20 minutes, for 300 hours. Telescoping or separation of the leading edges of the thin metal foil strips is considered a failure.

The Hot Shake Test and the Hot Cycling Test are hereinafter called "Hot Tests" and have proved very difficult to survive. Many efforts to provide a successful device have been either too costly or ineffective for a variety of reasons.

The structures of the present invention will survive these Hot Tests.

Early embodiments of electrically heatable catalytic converters were relatively large, especially in an axial directions, e.g., 7 to 10 or more inches long and up to 4.5 inches in diameter. These were inserted into an exhaust system either as a replacement for the conventional catalytic converter now in common use, or in tandem relation with such conventional catalytic converter in the exhaust line. It was then found that an axially relatively thin, or "pancake" electrically heated corrugated this metal honeycomb monolith could be used in close tandem relation with the conventional catalytic converter.

It was later found that even better performance resulted from a "cascade" of converters, i.e., a low thermal inertia electrically heatable converter (EHC), followed by a medium thermal inertia converter, followed by a large thermal inertia main converter, all on generally the same axis of gas flow. Each converter lad not only a different thermal inertia, but also a different geometrical cross-sectional area, or a different geometrical configuration, e.g., small circular, larger oval, to the final oval size and shape of a conventional unheated converter. This solution provided for fast, economical heating of the EHC. Heat generated from an oxidation reaction initiated in the EHC then heated the intermediate converter which in turn heated the large converter.

It should be noted that the electrically heatable honeycomb acts to preheat the exhaust gas to its "light-off" temperature where, in the presence of catalyst the pollutants are converted. Some conversion occurs in the electrically heatable device, and most of the conversion occurs in the final catalytic converter section which is normally not electrically heated.

It has been found float a "pancake" electrically heatable device and a conventional multicellular metal monolith catalytic converter may be positioned together within a common housing to take advantage of the common diameter and or geometric configuration (e.g., circular, oval or elliptical) in a cascading device, and having a shorter axial length than required in either the tandem relation or the prior cascade relation. These devices provided three units of differing thermal inertia. However, instead of a three structural member cascade device, the improved structure enabled a two member cascade device. Reference may be had to the copending, commonly owned, patent application of William A. Whittenberger and Edward T. Woodruff entitled "Core Element Useful in a Combined Electrically Heatable and Light-Off Converter" filed 3 Feb. 1993 and given Ser. No. 08/013,516. A still further advantage of the improved "cascade" device is that it facilitates manufacture from thin metal strips to form both the electrically heatable portion and the conventional metal monolith portion, or "light-off" portion, for encasing in a single housing. The devices of the present invention include improvements on the foregoing "cascade" devices. The duel purpose devices hereof may be backed up with a conventional catalytic converter of, for example, the commonly used ceramic type, the alumina pellet type, or the metal monolith honeycomb type mentioned above. Thus, the advantages of the cascade effect for successive light-off may be utilized without encountering a number of the problems associated therewith. Avoiding substantial electrical heating of a major portion of the thin metal honeycomb effects a major saving in electrical power required. As will become evident in the present structures, even further reduction in power requirements can be effected. The even smaller thermal mass of the hybrid "pancake" EHC portion of the present devices and the resulting exotherm further heats the exhaust gas and the subsequent "light-off" converter to effect substantial completion of the oxidation of pollutant materials in the presence of a catalytic agent or agents. The devices hereof may be thought of as "integral" in that at least some, but not all, of the thin sheet metal layers extend the entire axial length of the converter body, and the remainder are split or divided into an electrically heatable portion and an unheated portion to make up the axial length of the converter body.

Unlike the improved cascade devices described in the aforesaid application Ser. No. 08/322,258 wherein the electrically heatable "pancake" portion is physically separated from the "light-off" portion, those thin sheet metal layers or strips that are split in the devices hereof, are nevertheless in contiguous relation with adjacent fully axially extending thin metal layers or strips.

In the following description, reference will be made to "ferritic" stainless steel. A suitable ferritic stainless steel for use particularly in the engine exhaust applications hereof, is described in U.S. Pat. No. 4,414,023 dated 8 Nov. 9983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV." Another metal alloy especially useful herein is identified as Haynes 214 alloy which is commercially available. This alloy and other nickeliferous alloys are described in U.S. Pat. No. 4,671,931 dated 9 Jun. 1987 to Herchenroeder et al. These alloys are chacterized by high resistance to oxidation. A specific example contains 75% nickel, 16% chromium, 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steels and the Haynes alloys 214 and 230 are examples of high temperature resistive, oxidation resistant (or corrosion resistant) metal alloys that are suitable for use in making thin metal strips for use in the converter bodies hereof, and particularly for making heater strips for the EHC portions and "light-off" portions hereof. Suitable metal must be able Lo withstand "high" temperatures of 900 degrees C. to 1200 degrees C. (1652 degrees F. to 2012 degrees F.) over prolonged periods.

Other high temperature resistive, oxidation resistant metals are known and may be used herein. For most applications, and particularly automotive applications, these alloys are used as "thin" metal strips, that is, having a thickness of from about 0.001" to about 0.005", and preferably from 0.0015" to about 003".

In the following description, reference will also be made to fibrous ceramic mat, woven ceramic tape, or fabrics, or insulation. Reference may be had to U.S. Pat. No. 3,795,524 dated 5 Mar. 1974 to Sowman, and to U.S. Pat. No. 3,916,057 dated 28 Oct. 1975 to Hatch, for formulations and manufacture of fibers useful in making tapes and mats useful herein. One such woven ceramic fiber material is currently available from 3-M under the registered trademark "NEXTEL" 312 Woven Tape and is useful for insulation of thin metal strips or groups thereof. Ceramic fiber mat is commercially available under the trademark "INTERAM" also from 3-M. For most purposes, a coating insulation layer of alumina, or example, is preferred, A problem With the integral type combined electrically heatable and light-off converter has been with the mode of getting electrical power to the electrically heatable converter (or EHC) portion and at the same time providing structural retaining means for the thin metal layers. The present devices provide a solution to this problem.

BRIEF STATEMENT OF THE INVENTION

Briefly stated, the present invention is a converter body having a housing and a multicellular metallic core honeycomb formed of thin sheet metal layers, the multicellular metallic core honeycomb having a circular, oval or elliptical cross-section. The multicellular metallic core honeycomb is provided with a first portion which is electrically heatable, and a second portion which is a honeycomb light-off portion. The second, or light-off portion, is at least partially integrated with the first portion in that the thin sheet metal layers of the electrically heatable first portion are intertwined and overlap for at least part the axial length of the core with the sheet metal layers of the second or light-off portion. A tubular housing is provided for the second portion. The first, or electrically heatable portion, is retained and housed in a novel inner terminal bus and retainer. The terminal bus and retainer is provided with at least two isolatable segments as will be explained below, one of which is adapted to be connected to a voltage source and to the thin metal strips forming the electrically heatable elements in the first portion. The other of the isolatable segments is adapted to overlie and retain the intertwined and integral electrically heatable and light-off portions. Each of the at least two isolatable segments lies along the periphery of the cross-section. In automotive converter bodies, there is also provided an outer housing spaced and electrically isolated from the first, or inner housing and the terminal bus anti retainer. Suitable insulation may, be in the space between the inner and outer housings. The devices hereof have, desirably, a unitary converter body unit, i.e., one having an EHC (electrically heatable converter) and a light-off converter together in integral overlapping form in the same tubular housing. A voltage source is suitably attached to embodiments used, for example, in automotive vehicles. The multicellular metallic core honeycomb is desirably built up from alternating corrugated and flat thin metal sheets suitably layered and tightly spirally wrapped about a central U-shaped clip, or the like.

BRIEF DESCRIPTION OF THE DRAWINGS

The invention may be better understood by having reference to the annexed drawings showing a preferred embodiment of the invention and wherein.

DETAILED DESCRIPTION OF THE INVENTION

As indicated above, the present invention is an improvement on the devices shown and described particularly in the aforesaid commonly owned application Ser. No. 08/066,887. The devices described and claimed in the latter application and in the present application are "integral" devices meaning that instead of an isolated electrically heatable portion and non-electrically healable portion as described in application Ser. No. 08/322,258 filed 13 Oct. 1994, the electrically heatable portion and the light-off are engaged with one another at least in part, or "integral" with one another. The electrically heatable portion of the present devices is desirably at upstream end of the core and the major part of the light-off portion is at the downstream ends of the core. A part of the light-off portion is desirably located in the upstream end of the device.

One process or making the corrugated thin metal layers suitable for use herein is disclosed in U.S. Pat. No. 4,711,009, supra. A particular advantage of the process therein disclosed for corrugating and coating thin metal strips is that the strip may be coated prior to cutting to length and further assembly with a refractory metal oxide coating, e.g., alumina, gamma-alumina, gamma-alumina/ceria, vanadia, titania/vanadia, titania, titania/ceria, silica, titania/alumina, zirconia, etc., or an adsorption/desorption coating, e.g., a zeolite coating, and with a noble metal catalyst as described in that patent. This process may also be used for coating a flat thin metal strip by omitting the corrugation step. Other steps may be omitted, e.g., accordion folding, where, for example, the strip is to be precut to a given length for the layer, and further treated or handled before assembly. Alternatively, the converter bodies hereof may be fully assembled in the uncoated state, and the coatings of refractory metal oxide and noble metal catalyst applied after assembly by, for example, a dipping and calcining process. Also, the refractory metal oxide coating may be applied in a process such as described is the aforesaid U.S. Pat. No. 4,711,009 and the catalyst, where one is used, after applied by a dipping process and a calcining step. In most cases, the coatings on all the layers will be essentially the same. It should be noted, however, that different coatings applied to both sides or different layers, and different coatings and/or catalysts on the same layer may be used herein.

It will be noted that the corrugated thin metal layers in a preferred case extend axially from one end of the core to the other. Some of the flat thin metal layers extend from end to end. However, others of the flat thin metal layers are composed of two bands, one an electrically heatable band, which is connected to a voltage source, and the other a flat band, spaced from the heater band, not electrically connected, and completing the axial dimension of that layer. Thus, each corrugated thin metal layer has either a full axial length flat thin metal layer, or a split flat thin metal layer composed of two bands, one electrically heated and the other band not electrically heated. The cells generated by the contiguity of the alternating flat and corrugated thin metal layers extend from one end face of the core to the other. It is the interlocking of a part of the light-off portion with the electrically heatable portion that results in the name "integral" being applied to the converter body as a whole.

These devices are "multicellular," that is, they have a plurality of cells extending through the converter body, preferably in a straight-line path. In general, the cell density of the devices of this invention is in the range of from 50 to 1000 cells per square inch (cpsi) and desirably from about 150 cpsi to about 400 cpsi.

In general, the corrugations have an amplitude of from about 0.02" to 0.15" and a pitch of from about 0.02" to about 0.2" and a cross-section in the shape of a triangle with rounded apices to reduce stress. A wave form or sinusoidal corrugation may be used if desired.

Figure 1:
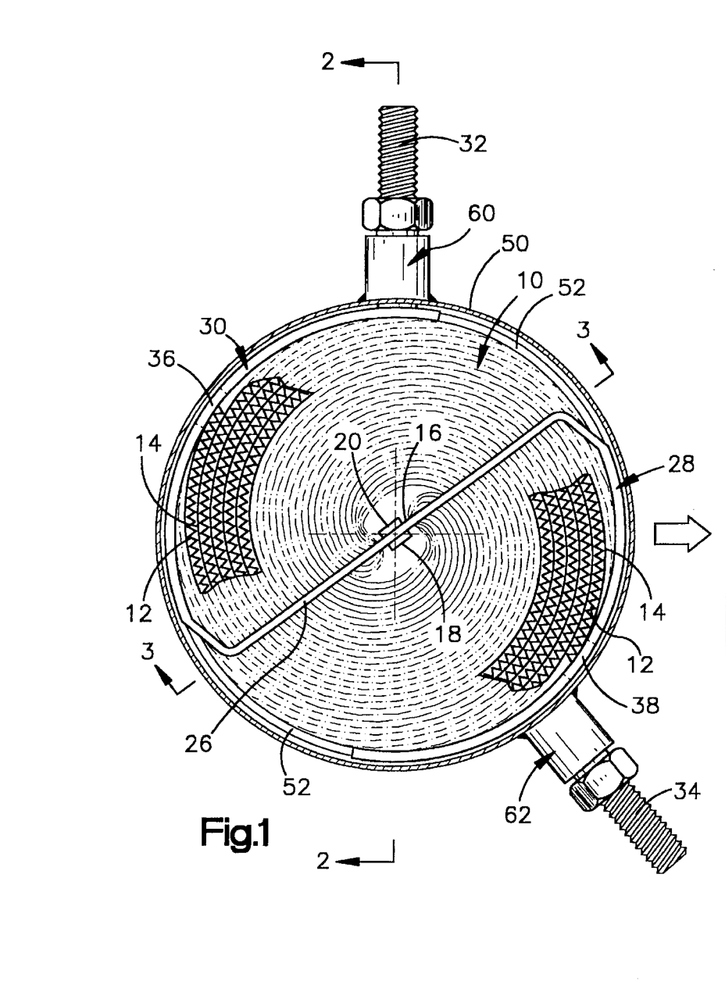
FIG. 1 is an end view taken from the gas inlet end of a multicellular core metallic core honeycomb of the present invention showing a novel terminal bus and retainer hereof.
Figure 2:
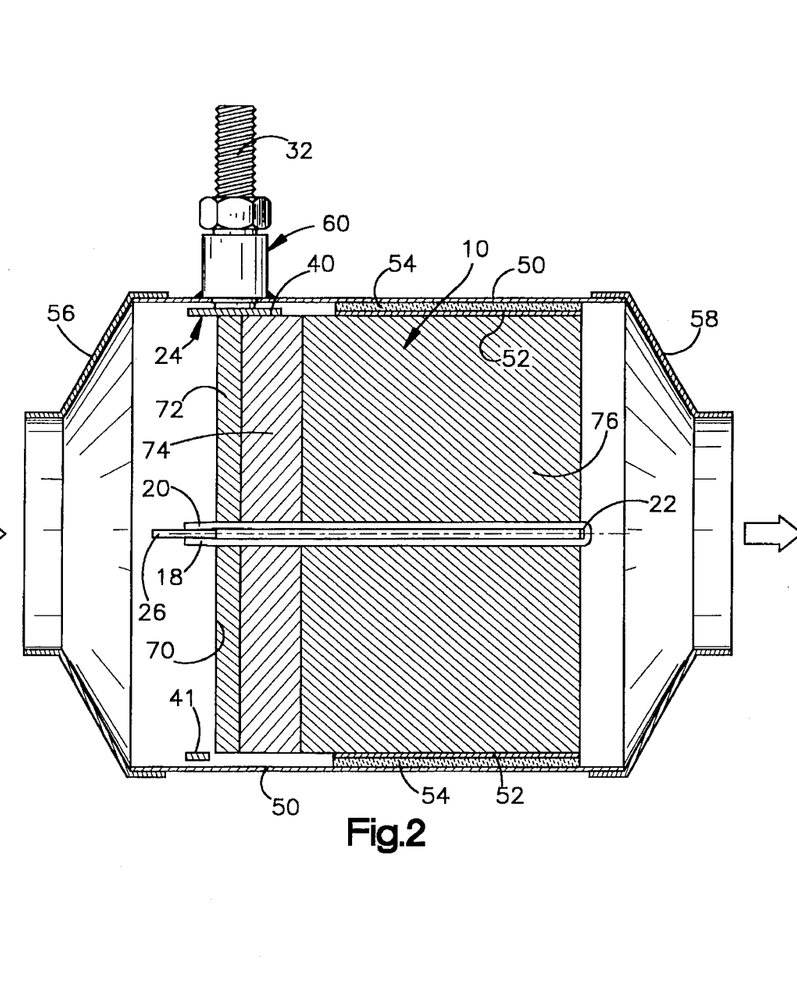
FIG. 2 is a cross-sectional view of the device shown in FIG. 1 as it appears in the plane indicated by the line 2—2 in FIG. 1.
Figure 3:
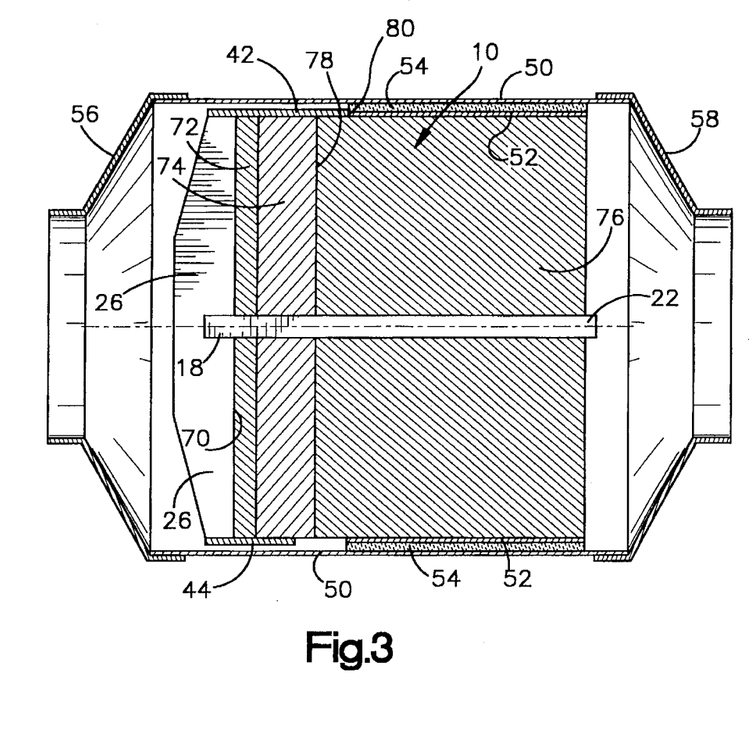
FIG. 3 is a cross-sectional view of the device shown in FIG. 1 as it appears in the plane indicated by the line 3—3 FIG. 1.

FIG. 1 is an end view of the gas inlet face, or gas inlet end, of a device in accordance herewith. FIGS. 2 and 3 are axial cross-sectional views as the device appears in the planes indicated by the lines 2—2 and 3—3 in FIG. 1. There is shown a multicellular metallic core honeycomb 10 formed of corrugated thin metal layers 12 in contiguous relation with flat thin metal layers 14. The center portions 16 (best shown as 92 in FIG. 10) are grasped between the legs 18 and 20 of a U-shaped clip 22 (FIG. 2), and the stack of thin metal layers tightly spirally wound in a spiral by twisting the clip 22 in a counterclockwise manner as shown in FIG. 1. The free ends of the legs 18 and 20 of the clip 22 are secured, as by welding or brazing, to a terminal bus and retainer of the present invention at the center of a metal crossbar 26 integral with the terminal bus and retainer 24, and extending across the upstream edges of the thin metal layers 12 and 14. The metal crossbar 26 in combination with the U-shaped clip 22 serves to hold the core body 10 stable in the extreme Hot Tests described above.

Figure 4:
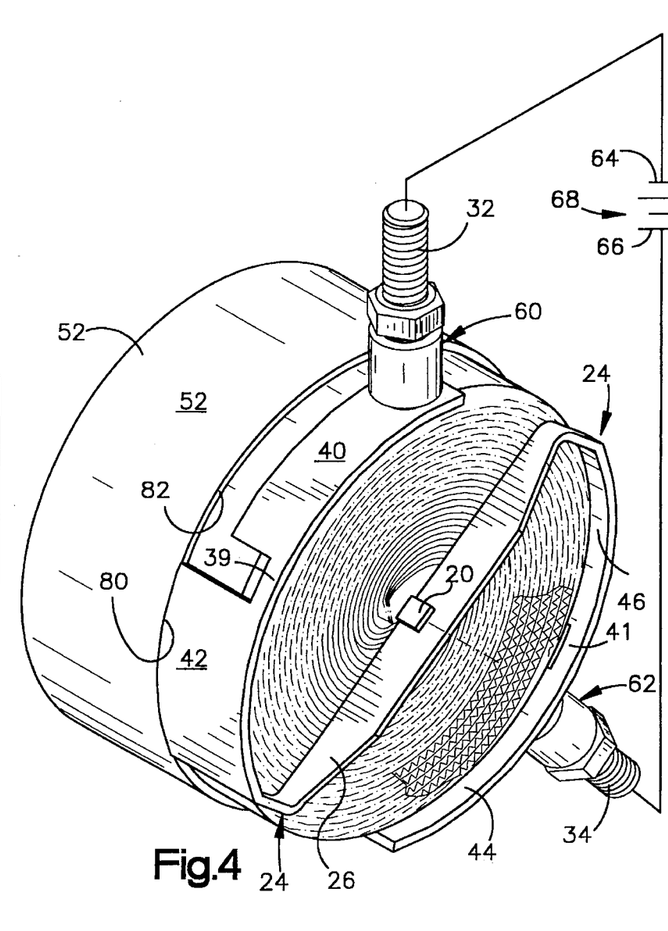
FIG. 4 is a perspective view of the device shown in FIGS. 1–3 showing the emplacement of a terminal bus and retainer hereof.

The terminal bus and retainer, generally indicated at 24, has a pair of arcuate members generally indicated at 28 and 30 that lie oil time circular periphery of the core body or core honeycomb 10. As will be described later in connection with FIG. 14, time arcuate members 28 and 30 each have two axially extending sectors (not shown in FIG. 1) of different axial length (See FIG. 4), the axially shorter sectors 40 and 44 of these being attached to terminals 32 and 34, respectively, and to one end of heater bands, as hereinafter described; and the axially longer sectors 42 and 46 these being attached to the opposite ends of heater bands, as hereafter described. Also shown in end view are portions 36 and 38 between dotted lines, better viewed in FIG. 4. These are narrow strips 39 and 41 joining the two axially extending portions or sectors 40 and 42, and time axially extending portions or sectors 44 and 46 as best shown in FIG. 4. The narrow strips 39 and 41 are removable after assembly, and are included only for assembly purposes.

Also shown in FIGS. 1 and 2, are an outer tubular housing 50 and an inner tubular housing 52 which are spaced from and out of electrical contact with each other. It is convenient to fill the space with insulation material 54, (FIG. 2) e.g., INTERAM, as mentioned above. In order to adapt the converter body 10 for insertion in an automobile exhaust system, there are provided end cap adaptors 56 and 58 suitably secured, as by welding or brazing, to the outer housing 50.

The terminals 32 and 34 extend through the outer housing 50 through an insulated feed-through generally indicated at 60 and 62. For details of a suitable insulated feed-through, reference should be had to commonly owned, co-pending application Ser. No. 07/931,313 filed 17 Aug. 1992 by Sheller et al. Terminal 32 is stud welded, for example, to time sector 40 of time terminal bus and retainer 24 and is, in turn, connected to one pole 64 of a voltage source generally indicated at 68 in FIG. 4. The opposite terminal 34 is stud welded, for example, to the portion 44 of the terminal bus and retainer generally indicated at 24 (FIG. 4) and is, in turn, connected to the other pole 66 of a voltage source 68. In an automotive vehicle, the voltage source is normally a 12 volt or 24 volt lead-acid battery. Higher voltages may be used, and may be AC or DC, single or multiphase up to 120 volts or higher.

As indicated in FIGS. 2 and 3, the gas contacting the inlet face 70 first encounters the heater bands (FIG. 9) lying in the region 72 where its temperature is raised to light-off temperature. The gas then passes into a region 74 which is the region of overlapping between the thin metal layers of the light-off region 76 and the thin metal layers of the electrically heatable region 74. The regions 72 and 74 together constitute the electrically heatable zone, and the zone or region 76 is the light-off portion of the converter body 10.

Referring now to FIGS. 3 and 4, it will be observed that the axial extent the of the portion 42 of terminal bus and retainer 24 spans the division line 78 between the electrically heatable portion 72-74 of the converter body 10 and the light-off portion 76. The downstream edge 80 of the terminal bus and retainer 24 actually abuts the upstream edge 82 of the inner housing 52, and may desirably be seam welded thereto. It will be seen, therefore, that there is provided in the order of gas passage through the device, a directly electrically heatable zone or region 72 having a given thermal inertia, an intermediate indirectly electrically heatable zone or region 74 having a larger thermal inertia, and a light-off zone or region 76 having a still larger thermal inertia. These three elements of a "cascade" device are present albeit of the same diameter and in a single housing. This greatly simplifies the structure of a "cascade" installation while preserving the advantages thereof.

The thin metal layers, both flat and corrugated, are desirably coated on at least one side, and preferably both sides, with a washcoat of a refractory metal oxide to a loading of from 10 to 40 mgs/sq.in. of surface area. The refractory metal oxide may be alumina, alumina/ceria, titania, titania/ceria, titania/alumina, zirconia, silica, etc. such as those mentioned above. It his tightly adhered to the metal surface. Desirably, a noble metal catalyst, e.g., platinum, palladium, rhodium, ruthenium, indium, or mixtures of two or more of such metals is deposited on the surface of the refractory metal oxide. The heater bands (See FIG. 9) may be coated with a barrier coating which may be a "dielectric" coating. A very satisfactory and preferred coating system for the metal surfaces of the devices hereof, and particularly the thin metal strips or layers in either or both of the electrically heatable and the light-off portions, involves applying one or more layers of washcoat of gamma-alumina applied by electrophoretic deposition to a loading of from 10 mgs. per square inch up to about 35 mgs. per square inch, followed by drying and calcining at about 1000 degrees C. for up to 30 to 90 minutes, e.g. 60 minutes. The surface is then treated with a liquid dilute aqueous solution of phosphoric acid (about 23% by weight concentration) by brush or spray application. The surface is then blotted and dried with an electric dryer, followed by again calcining at about 1000 degrees C. for about 5 minutes. This preferred process is the invention of William B. Retallick.

A procedure for applying a "dielectric" coating involves first coating the cleaned metal surface with a single washcoat of gamma-alumina slurry to a loading of about 5 to 10 mg per square inch of surface, followed by drying and then calcining at 700 to 1200 degrees C. (1292 to 2192 degrees F.) for at least about 10 seconds, to form a tightly bonded insulative coating. This is typically followed by from 1 to 6 or more coatings of gamma-alumina/ceria slurry, or washcoat, to a total loading of about 30 to 40 mgs/sq.in., drying after each coat and then calcining at about 500 degrees C. (930 degrees F.). The usual coating with a refractory metal oxide produced at a lower temperature of 500 to 1200 degrees F. also has insulating properties, but not to the same degree as the "dielectric" coating. The "dielectric" coating is believed to be a spinel, or a complex refractory metal oxide, and thus is chemically different from the normal refractory metal oxide coating calcined at a lower temperature. To coat thicker parts, such as housings, retaining rings, etc., plasma spraying of gamma-alumina may be used. High temperature calcining may be used in this case, if desired, to form a "dielectric" coating on such parts.

Figure 5:
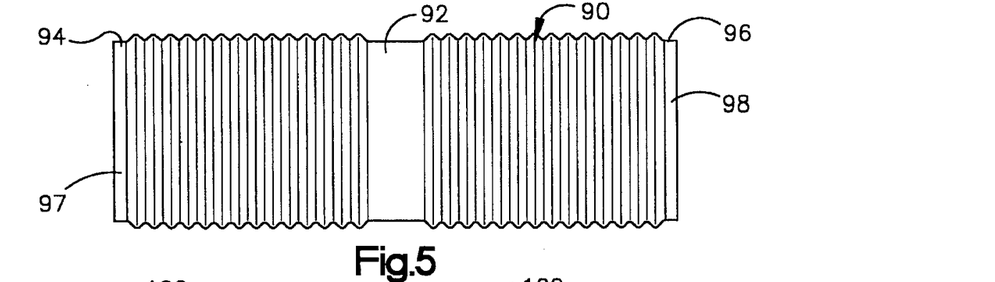
FIG. 5 is a an view of a corrugated thin metal sheet used in building up the metallic core honeycomb.

FIG. 5 shows a typical corrugated thin metal layer 90 as used herein. In a specific embodiment, the corrugated thin metal layer 90 has a flattened center portion 92, usually about 0.25 inch wide. The layer is overall about 3 inches wide by about 11.4" long. The strip ends are cleaned of coating to facilitate brazing or welding. The end 94 is cleaned of coating on the top side in the area 97, and the end 96 cleaned of coating on the bottom side the area 98.

Figure 6:
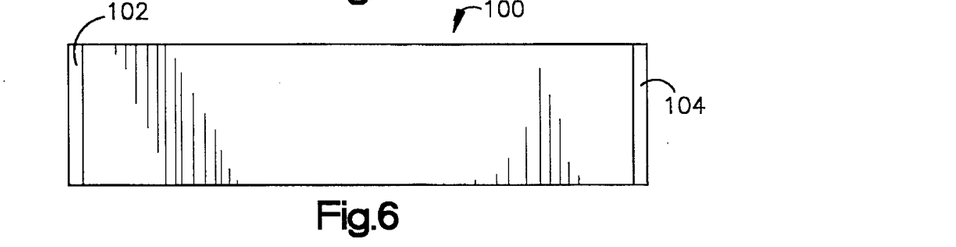
FIG. 6 is a plan view of a flat thin metal sheet used in building up the light-off portion of the metallic core honeycomb.

FIG. 6 shows a flat thin metal band 100 for use in the electrically heatable portion 74 of the converter body 10. In a specific embodiment, the flat thin metal band 100 has cleaned end portion 102 on the top side of the thin metal layer 100, and end portion 104 on the bottom side of the thin metal band 100 in which any refractory metal oxide coating is removed. The band 100 is about 2" wide, 0.002" thick, and 11.4" long.

Figure 7:
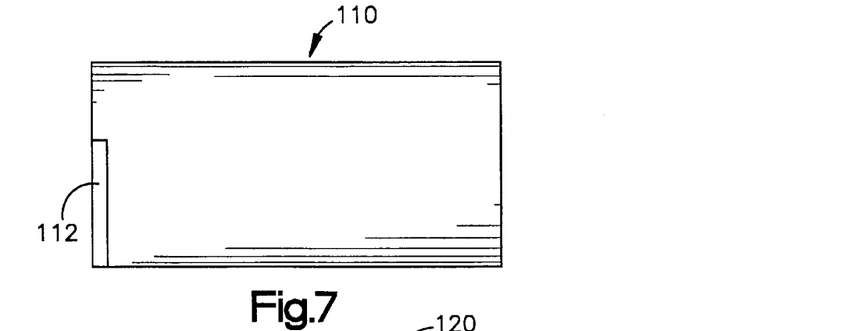
FIG. 7 is a plan view of a flat thin metal divider strip as shown in FIG. 10.

FIG. 7 is a plan view of a flat thin metal divider layer 110 used at each end of the stack of thin metal layers making up the converter body 10. In a specific embodiment, the divider layer 110 is 2.9" wide by about 6.3" long. The area 112 on the top of the layer 110 is cleaned of any refractory metal oxide coating to facilitate brazing. The function of the divider layer 110 is to prevent nesting of the wound penultimate corrugated thin metal strips 90.

Figure 8:
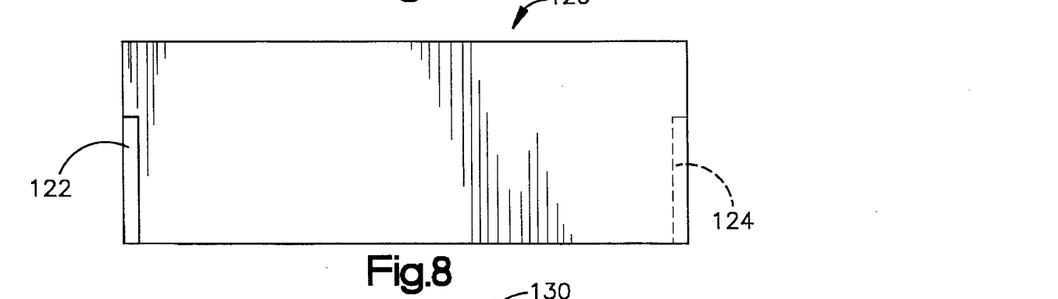
FIG. 8 is a plan view of a full width flat thin metal strip.

FIG. 8 is a plan view of a full width flat thin metal layer 120 used in both the electrically heatable portion 72-74 and the light-off portion 76. The top of the layer 120 at the end is cleaned of refractory metal oxide coating in the area 122, and the bottom of the layer 120 at the end is cleaned of refractory metal oxide coating in the area 124 to facilitate brazing. The layer 120 is, in a specific example, is about 2.9" wide by about 11+" long.

Figure 9:
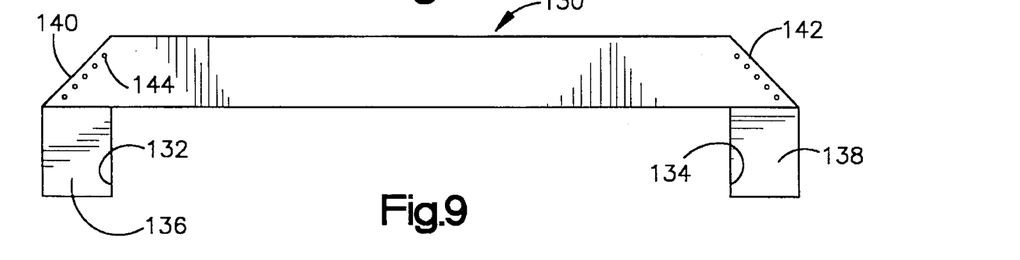
FIG. 9 is a plan view of a flat thin metal heater band with the ends folded to provide orthogonally related tabs at each end.

FIG. 9 is a plan view of a heater band 130 which is dimensioned and configured for attachment to the terminal bus and retainer 24. In a specific embodiment, the heater band 130 is 0.3" wide between the lines 132 and 134 and about 13 inches long. The tabs 136 and 138 have a length of about 0.5" and are formed by folding ends of the band 130 to provide a right angularly related member. The distal ends of the tabs 136 and 138 are cleaned of any coating so that they may be brazed to the terminal bus and retainer 24. To preserve the 45 degree folds 140 and 142, they are pinch welded, as at weld spot 144, with a capacior discharge welder. This heater band is desirably coated on both sides with an alumina/phosphate coating as described above.

Figure 10:
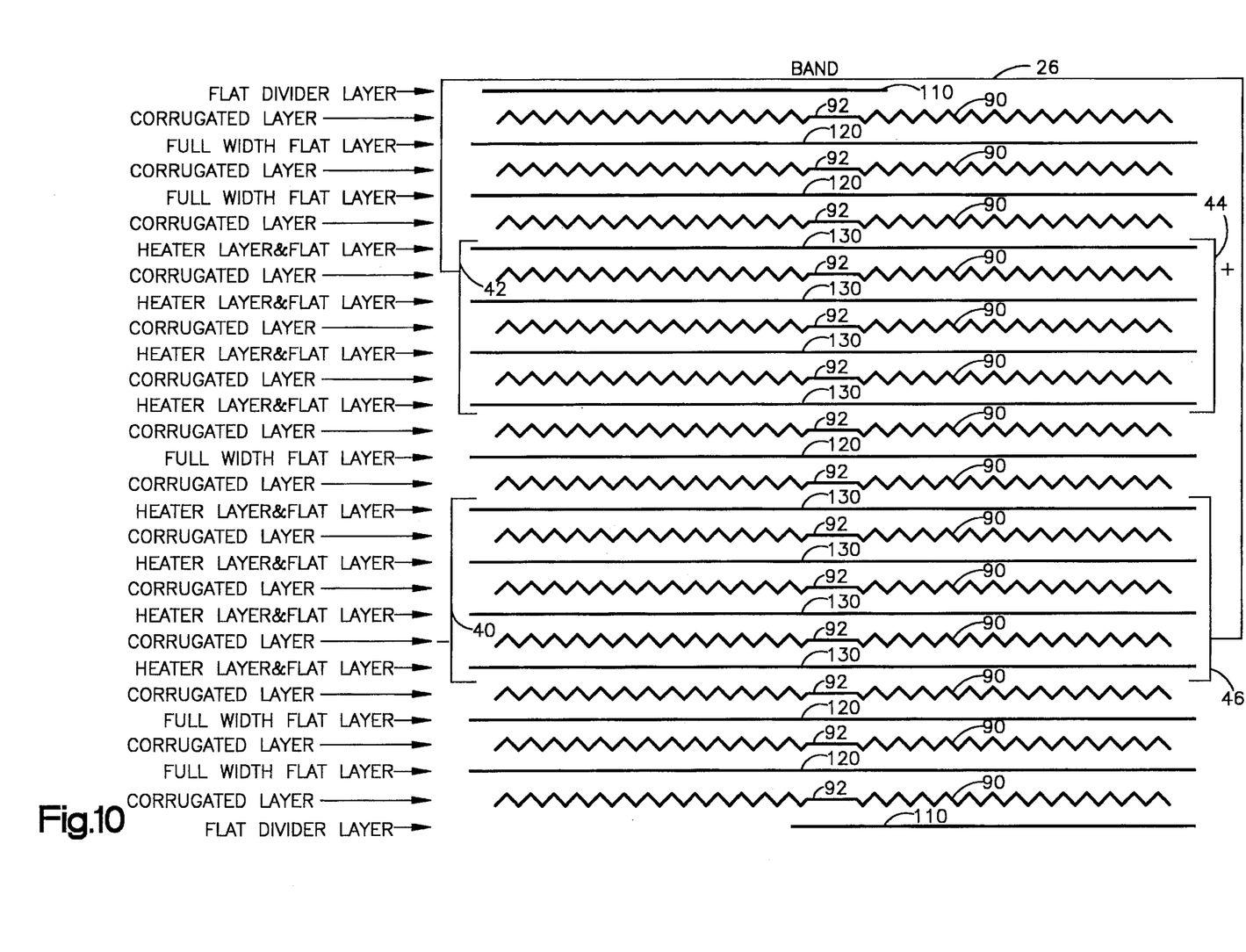
FIG. 10 is a diagrammatic illustration of a metal core honeycomb stack of thin metal strips showing two heater circuits in series.

FIG. 10 is a diagrammatic and schematic layout of the layers of thin metal layers in a typical converter body. In the illustrated stack of FIG. 10, the top and bottom layers are the divider layers 110 of FIG. 7. The corrugated thin metal layers 90 are shown in FIG. 5 with the flattened center portion 92. All of the corrugated thin metal layers have a width equal to the full axial extent of the core 10, keeping in mind that the individual layers have a length of about 11+ inches and a width of about 2.9". The core 10 is formed by grasping the stack of FIG. 10 at the center portions 92, compressing the stack, and spirally wielding to form the core 10. FIG. 10 shows the stack from the gas inlet face 70 (FIGS. 2 and 3).

The first two layers are first, a flat divider strip or layer 110, and second a full width corrugated thin metal layer 90, then the full width flat layers 120 alternated with two full width corrugated layers 90. The next seven layers (proceeding from time top of FIG. 10 downward are four heater bands 130 (FIG. 9) and three corrugated thin metal layers 90 (FIG. 5) in alternating relation. The next three layers are two corrugated thin metal layers 90 (FIG. 5) and one full width flat thin metal layer 120 in alternating relation. The next seven layers are four heater bands 130 (FIG. 9) and three corrugated thin metal layers 90 (FIG. 5). The next five layers are three corrugated thin metal strips or layers 90 alternating with two flat thin metal layers 120. Finally, there is provided a flat thin metal divider layer 110. The final flat thin metal layer 110 is the same as the first fiat thin metal divider layer 110 only turned end-for-end.

It should be pointed out that with the flat thin metal heater bands 130, only the leading edges (i.e., the edges first contacted by gas entering the converter body 10) are shown in FIG. 10. The heater bands 130 of FIG. 9 are backed up by flat thin metal bands 100 which fill out the axial extent of the heater band layers. Together the flat thin metal heater band 130 and the flat thin metal band 100 with the small space between them constitute a full width or "layer", the term "band" being applied to distinguish these elements from the full width corrugated and full width flat thin metal layers.

The end tabs 136 of the heater bands 130 (FIG. 9) at the left hand end of the diagram in FIG. 9, in the first group of seven layers mentioned above, are brazed or welded to the terminal bus and retainer 24 at the connector bus sector 42 as shown in FIG. 4. Connector bus sector 42 is directly connected to connector bus sector 46 through the bar 26. The end tabs 138 of the heater bands 130 (FIG. 9) at the right hand end of the diagram in FIG. 10, in the first group of seven layers mentioned above, are brazed or welded to the terminal bus sector 44 of the terminal bus and retainer 24. Sectors 42 and 46 are connector buses, i.e., they are not directly connected to a voltage source. Terminal bus sector 44 is directly connected to the positive pole of a battery, not shown in FIG. 10, but indicated by a "+" sign.

The next group of seven layers proceeding in a downward direction are like the first group of seven layers described above. The group consists of four thin metal heater bands 130 in alternating relation with three corrugated thin metal layers 90. The four thin metal heater band tabs 138 are brazed or welded to the connector bus sector 46 at the right hand end thereof, and the tabs 136 are, in turn, brazed or welded to the terminal bus sector 40. Terminal bus sector 40 is directly connected through the terminal 34 to the negative pole of a voltage source (not shown) as indicated by the "−" sign.

Flat band 100 is a rectangle about 2" wide by 10.4" long by 0.002" thick having cleaned top and bottom ends 102 and 104.

The stack of 29 layers such as described above is compressed and grasped in the middle with a U-shaped clip 22 (FIG. 2) and tightly spirally wound in a clockwise, or counterclockwise, manner to form the core 10 in accordance herewith.

Figure 11:
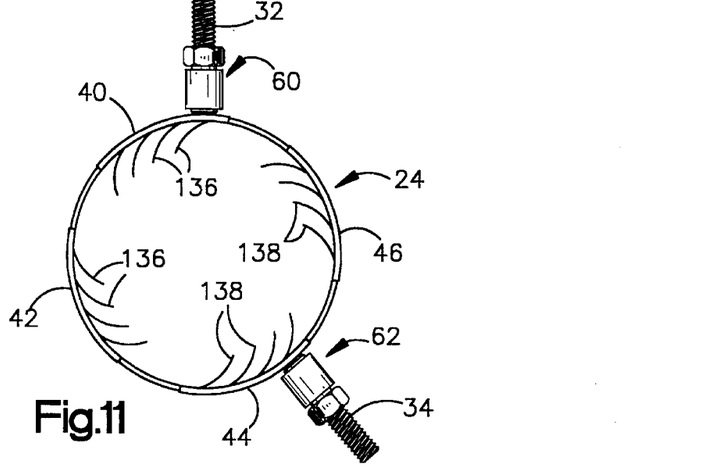
FIG. 11 shows diagrammatically an end view or a core with the overfolded ends of the heater bands as secured to a four-segment terminal bus and retainer ring, or bar, hereof.

FIG. 11 is a diagrammatic illustration of the foil to bus welding or brazing pattern. The terminal 32 extends through the insulated feed-through generally indicated at 60 and is stud welded to the terminal bus sector 40 of the terminal bus and retainer 24. The end tabs 136 of the heater bands 130 in the next group are spot welded to the terminal bus sector 40, as indicated, and the end tabs 138 of the same heater bands 130 are spot welded to the connector bus sector 46. Likewise, the end tabs 138 of the heater bands 130 in the first group are spot welded to the terminal bus sector 44 and the ends 136 of the same heater bands are spot welded to the connector bus sector 42.

In FIG. 10, there have been shown eight flat heater bands 130 and five flat strips 120. It is contemplated that the five flat strips 120 may be replaced with five heater bands 130 and suitably connected electrically, so that instead of a partially electrically heated front face 70 (FIG. 2), the entire front face 70 is electrically heated. It is also contemplated that instead of flat heater bands 130 and flat bands 100 to back them up in an axial direction, the flat heater bands 130 and the flat back-up bands 100 may be exchanged with corrugated thin metal heater bands and corrugated back-up bands.

Figure 12:
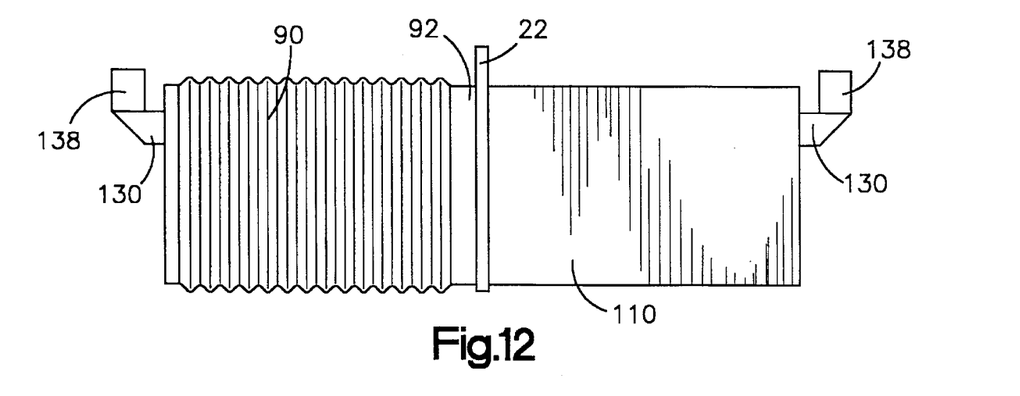
FIG. 12 is a top view of a stack showing a divider strip, a corrugated strip underlying the divider tab, and a heater band with the tabs projecting, and having a clip holding the stack prior to winding.

FIG. 12 is a top view of a stack of thin metal strips showing a divider strip 110, part of an underlying corrugated thin metal strip 90, a portion of the flattened center 92 and protruding ends or end tabs 136 and 138 of a heater band 130 (FIG. 9).

Figure 13:
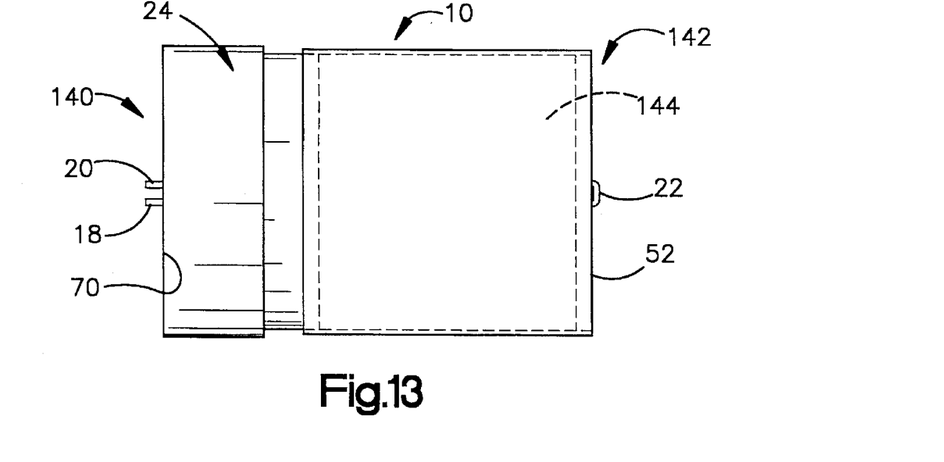
FIG. 13 is a side view of a catalytic converter showing the electrically heatable end and the light-off end of the converter body.

FIG. 13 is a diagrammatic side view of a converter body 10 showing the location of the terminal bus and retainer 24, the free ends or legs 18, 20 of the clip 22, the upstream, or inlet face 70, at the upstream end 140 of the converter body 10 and the downstream or outlet face 52 at the downstream end 142. The light-off body 144 is shown in dotted lines.

Figure 14:
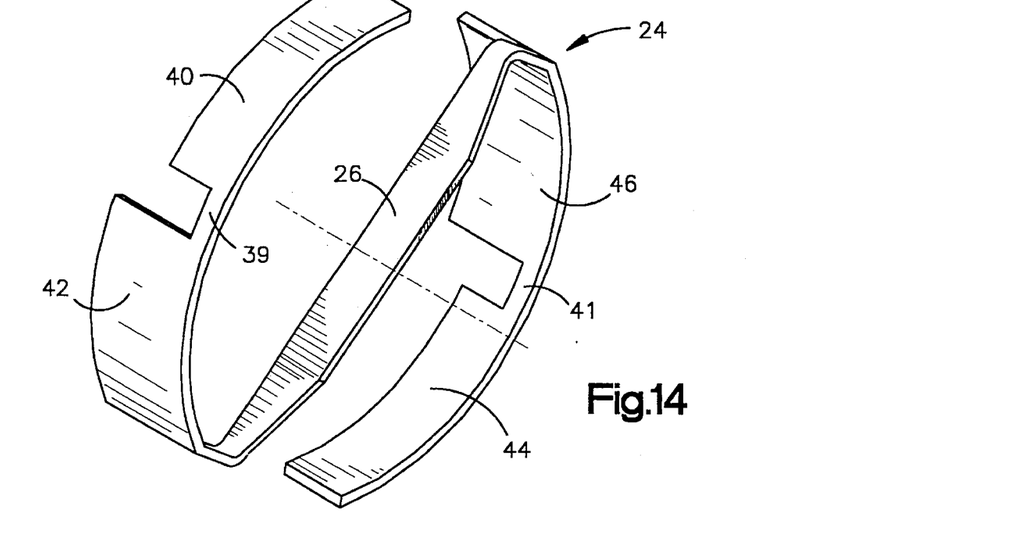
FIG. 14 is a perspective view of a S-shaped terminal bus and retainer in accordance herewith.

FIG. 14 is a perspective drawing of a terminal bus and retainer 24 of this invention. There are provided axially longer sectors 42 and 46 which are arcs of a circle, and axially shorter sectors 40 and 44 also arcs of a circle. Joining the arcuate sectors 46 and 42 is a cross bar 26 to which, as shown in FIGS. 1 and 2, the free ends 18 and 20 are secured as by welding or brazing. Between the sectors 40 and 42, is a narrow strip 39. Also between sectors 46 and 44 is a narrow strip 41. These narrow strips 39 and 41 are to be cut away from the sectors 40–42 and 44–46 after assembly. Otherwise, there would be a dead short across these strips 39 and 41 instead of forcing the current to go through the heater bands 130 in the fully assembled device.

Figure 15:
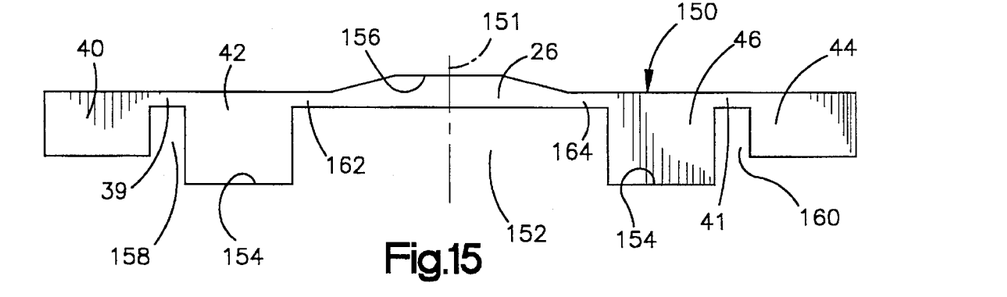
FIG. 15 is a drawing of a metal blank from which the S-shaped terminal bus and retainer of FIG. 14 is formed.

FIG. 15 is a blank from which the structure of FIG. 14 can be made. The blank includes a metal bar 150 having a top marginal edge 156 and a bottom marginal edge 154. The bar 150 has a predetermined width and a predetermined length. The bar has a centrally disposed notch 152 extending from the bottom marginal edge 154 extending toward the top marginal edge 156. The notch 152 is dimensioned to span the converter core 10 from side to side. There is a pair of first projections 42 and 46, corresponding to the sectors 42 and 46 of FIG. 14, extending from the top marginal edge 156 to and, preferably including, the bottom marginal edge 154 and bounding each side of the central notch 152. A pair of notches 158 and 160 lying outwardly of said projections 42 and 46, respectively, extends from time bottom marginal edge 154 toward the top marginal edge 156 and each defining a severable metal strip 39 and 41 with the top marginal edge 156. There is a second pair of projections 40 and 44 located at the distal extremities of the metal bar 150 and corresponding to the sectors 40 and 44 as shown in FIG. 14. The projections 40 and 44 do extend a distance toward the bottom marginal edge 154 less than the full width of the bar 150. The blank 150 is formed into an S-shape having a circular outer periphery. The cross bar 26 has narrower portions 162 and 164 from which the top marginal 156 edge slopes upwardly to the full width of the bar 150. The structure is desirably symmetrical about the centerline 151.

Figure 16:
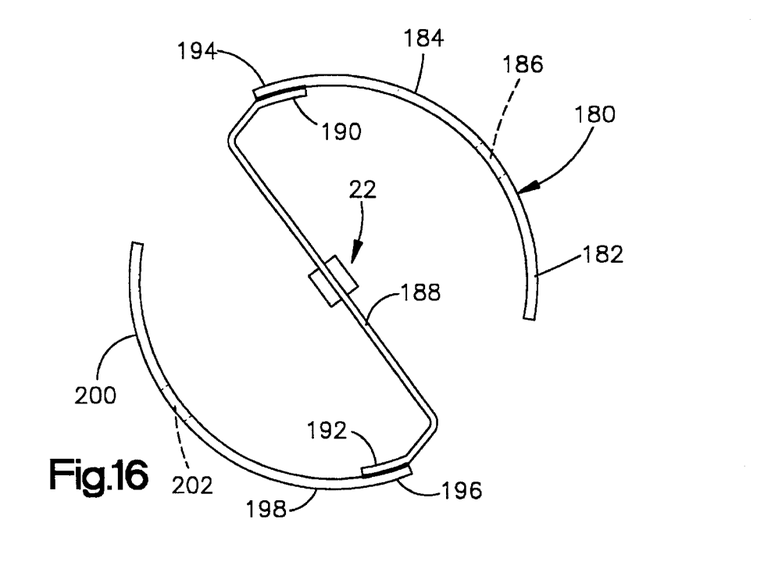
FIG. 16 is a top plan view of a preferred form of terminal bus and retainer for use in the structures of this invention.

FIG. 16 shows a three-piece terminal bus and retainer ring generally indicated at 180. This structure is characterized in that the cross bar 188 of generally S-shape, is welded at each end 190 and 192 to the arcuate members 194 and 196 instead of being continuous therewith as in the case of the structure 24 shown in FIG. 1. The cross bar 188 joins two connector bus sectors 198 and 184 thereby providing electrical connection between the sectors. Connector bus sectors 198 and 184 are each connected by a narrow removable portion 202 and 186, respectively, to terminal bus portions 200 and 182, respectively. The U-shaped clip 22 is shown attached to the center of the cross bar 188. The three-piece structure of FIG. 16 is less costly and less complex to make and use, and produces less scrap.

Numerous variations in the preferred structure above described may be used without departing from the invention. For example, although electrical connections at the outside diameter of the core have been shown, they may be made at the center of the core and at the outside diameter. While straight-through cells have been shown, patterned cells, such as those formed with herringbone or chevron shaped corrugations, may also be used. Where the latter type o corrugations are used, the flat thin metal layers may be omitted. While thin metal layers have been shown and described without tabs on the ends of the strips, as shown for example in U.S. Ser. No. 08/322,258 supra, the structure of the latter Ser. No. 08/322,258 may be used, if desired. While a circular core body has been shown, it will be understood that any cross-sectional configuration, e.g., oval, elliptical, rectangular, or the like may be used. The electrically heatable portions, while desirably integral and intertwined with the light-off portion, may be separated or isolated from the light-off portion. Instead of solid sheet thin metal strips as are preferred herein, perforated thin metal strips for either or both of the the flat or corrugated thin metal strips, including screen, may be substituted therefor. While it is desirable to make the devices hereof from a single stainless steel alloy or nickel/chromium alloy, it will be found desirable to in certain cases to strengthen the core body by using various reinforcing means, such as fashioning some of the thin metal strips from a stainless steel, for example, and others from a nickel/chromium alloy; or by doubling or tripling the thickness of one or more of the strips or layers. The improved recessed corrugated thin metal strips hereof, and especially in combination with the heater bands hereof may be used in any of the foregoing variations.

What is claimed is:

1. A converter body comprising (a) a multicellular metallic core honeycomb formed of thin sheet metal layers, said multicellular metallic core honeycomb having a circular, oval or elliptical cross-section, said multicellular metallic core honeycomb having least one electrically heatable portion and at least one unheated honeycomb portion, the thin metal layers of the electrically heatable honeycomb portion being intertwined and integral with the thin sheet metal layers of the unheated honeycomb portion, said core honeycomb having a gas inlet face and a gas outlet face; (b) a tubular housing for said unheated honeycomb portion; and (c) a terminal bus and retainer for surrounding said electrically heatable honeycomb portion and said unheated honeycomb portion, said terminal bus and retainer comprising a shaped metal bar including at least two isolatable segments, at least one of said segments including means for connecting said at least one of said segments to a voltage source, and the other of said at least two isolatable segments dimensioned and configured to overlie and retain the intertwined integral electrically heatable and unheated portions, and each of said at least two isolatable segments lying along the periphery of said cross-section of said core honeycomb; said a shaped metal bar having a top marginal edge and a bottom marginal edge, a centrally disposed notch in sand bar in which said core honeycomb is disposed, a pair of first projections bounding said centrally disposed notch, each of said projections having a predetermined axial length extending from said top marginal edge toward said bottom marginal edge, a pair of notches outwardly of said projections, respectively, said pair of notches extending from said bottom marginal edge toward said top marginal edge, and each defining a severable strip along the top maraginal edge.

2. A converter body as defined in claim 1 further comprising an outer housing surrounding and spaced from said tubular housing.

3. A converter body as defined in claim 1 wherein the thin metal layers are alternating flat and corrugated thin metal layers.

4. A converter body as defined in claim 1 wherein the thin sheet metal layers are stainless steel.

5. A converter body as defined in claim 4 wherein the stainless steel is ferritic stainless steel.

6. A converter body as defined in claim 1 wherein the sheet metal layers are a nickel/chromium alloy.

7. A converter body as defined in claim 1 wherein some of the sheet metal layers are stainless steel, and the remainder are a nickel/chromium alloy.

8. A converter body as defined in claim 1 wherein the thin sheet metal layers are coated with a refractory metal oxide.

9. A converter body as defined in claim 1 wherein the thin metal layers of the electrically heatable honeycomb portion are coated with a "dielectric" coating.

10. A converter body as defined in claim 1 wherein the thin metal layers of the electrically heatable honeycomb portion are flat and coated with an alumina/phosphate coating.

11. A converter body as defined in claim 8 wherein the thin metal layers have a catalyst disposed on the surface of said refractory metal oxide coating.

12. A converter body as defined in claim 11 wherein the catalyst is a noble metal catalyst.

13. A converter body as defined in claim 12 wherein the noble metal catalyst is selected from the group consisting of platinum, palladium, rhodium, ruthenium, indium, and mixtures of at least two of such metals.

14. A converter body as defined in claim 1 wherein the electrically heatable portion is formed of thin sheet metal layers including a first plurality of corrugated thin metal layers having an axial length substantially equal to an axial length of the converter body, a second plurality of flat thin metal layers having an axial length substantially equal to the axial length of the converter body, and a third plurality of layers including flat thin metal electrically heatable heater bands axially spaced from flat thin metal bands, the third plurality of layers having an axial length composed of the axial length of the flat thin metal heater bands, the axial length of the flat thin metal bands, and an axial length of the space between the flat thin metal heater bands and said flat thin metal bands, said flat thin metal heater bands being connected to said voltage source.

15. A converter body as defined in claim 14 wherein the heater bands are elongated strips of flat thin metal having ends, the ends of said elongated strips of flat thin metal being folded orthogonally to said strip to provide tabs, and said tabs at at least one end being secured to said terminal bus and retainer.

16. A converter body as defined in claim 15 wherein the shaped metal bar also includes a pair of second projections at distal extremities thereof.

17. A converter body as defined in claim 16 wherein the shaped metal bar also includes a metal cross bar extending between said at least two isolatable e segments and in contact with one of the faces of said converter body.

18. A converter body as defined in claim 17 wherein the metal cross bar is in contact with the gas inlet face of the converter body.

19. A converter body as defined in claim 14 wherein the flat and corrugated thin metal layers of the core honeycomb are in alternating relation to define a plurality of cells, and said thin metal layers are aligned at the midpoints thereof, a U-shaped central clip gripping the aligned thin metal layers at the midpoints thereof, said U-shaped clip having free ends, and said core honeycomb being tightly spirally wound about said U-shaped clip.

20. A converter body as defined in claim 19 wherein the shaped metal bar also includes a metal cross bar joining the pair of said at least two isolatable segments of said shaped metal bar, and contacting the inlet face of said multicellular honeycomb core, the free ends of said U-shaped clip secured to said metal cross bar.

21. A terminal bus and retainer for a multi cellular honeycomb converter core formed of thin metal layers and having a circular, oval or elliptical cross-section and having an electrically heatable portion including electrically heatable heater bands, each band having a first end and a second end, and an intertwined integral unheated portion, said terminal bus and retainer comprising a shaped metal bar including at least two isolatable first segments, at least one of said at least two isolatable first segments including means for connecting to a power source, said shaped metal bar having a top marginal edge a centrally disposed notch in said bar, a pair of first projections bounding said centrally disposed notch, each of said first projections having a predetermined axial length extending from said top marginal edge toward said bottom marginal edge, a pair of notches outwardly of said first projections, respectively, said notches extending from said bottom marginal edge of said metal bar toward said top marginal edge of said metal bar, and each of said pair of notches in said metal bar defining a severable metal strip along said top marginal edge of said metal bar.

22. A terminal bus and retainer as defined in claim 21 wherein the metal bar is integral with said first projections.

23. A terminal bus and retainer as defined in claim 21 wherein said shaped metal bar further includes at least two additional segments.

24. A terminal bus and retainer as defined in claim 23 wherein said at least two additional segments define two second projections projecting from said top marginal edge toward said bottom marginal edge.

25. A terminal bus and retainer as defined in claim 23 wherein the first isolatable segments have an arcuate shape and the additional segments also have an arcuate shape.

26. A terminal bus and retainer as defined in claim 25 wherein the arcuate shape is the arc of a circle.

27. A terminal bus and retainer as defined in claim 21 wherein the metal bar is bent into the shape of a circle.

28. A terminal bus and retainer as defined in claim 21 wherein the metal bar is bent into an S-shape.

29. A blank for a terminal bus and retainer for retaining thin metal layers forming a converter core having a circular, oval, or elliphical cross-section, comprising a metal bar having a top marginal edge and a bottom marginal edge, and distal extremities; said metal bar having a predetermined width and a predetermined length; a centrally disposed notch in said metal bar; a pair of first projections having a predetermined width and extending from the top marginal edge toward the bottom marginal edge; a pair of notches outwardly of said first projections, respectively, said pair of notches extending from said bottom marginal edge toward the top marginal edge and each notch defining a severable metal strip along the top marginal edge of said metal bar.

30. A blank as defined in claim 29 further comprising a pair of second projections at the distal extremities of said metal bar extending from the top marginal edge of said metal bar toward the bottom marginal edge of said metal bar.

31. A blank as defined in claim 29 wherein the centrally disposed notch is dimensioned to span the cross-section of the converter core from side to side.

32. A blank as defined in claim 29 wherein said first projections extend from the top marginal edge of said metal bar toward the bottom marginal edge a distance less than the full width of said metal bar.

33. A blank as defined in claim 30 wherein the second projections at the distal extremities of said blank each extend from the top marginal edge toward the bottom marginal edge a distance less than the full width of said metal bar.

34. A blank as defined in claim 29 wherein a first projection bounding at least one side of said central notch extends from the top marginal edge of said metal bar toward the bottom marginal edge of said metal bar a distance less than the full width of said metal bar.

* * * * *